(12) United States Patent
Hoffman, Jr. et al.

(10) Patent No.: US 12,173,963 B2
(45) Date of Patent: Dec. 24, 2024

(54) DRYER CONVEYOR BELT TRACKING SYSTEM

(71) Applicant: M&R Printing Equipment, Inc., Roselle, IL (US)

(72) Inventors: Richard C. Hoffman, Jr., Lake Forest, IL (US); Mariusz Switalski, Des Plaines, IL (US); Jerzy Podstawka, Arlington Heights, IL (US); Dariusz Tkacz, Naperville, IL (US)

(73) Assignee: M&R PRINTING EQUIPMENT, INC., Roselle, IL (US)

( * ) Notice: Subject to any disclaimer, the term of this patent is extended or adjusted under 35 U.S.C. 154(b) by 0 days.

(21) Appl. No.: 18/220,662

(22) Filed: Jul. 11, 2023

(65) Prior Publication Data
US 2024/0003622 A1 Jan. 4, 2024

Related U.S. Application Data

(63) Continuation of application No. 17/546,751, filed on Dec. 9, 2021, now Pat. No. 11,740,017, which is a
(Continued)

(51) Int. Cl.
*F26B 3/30* (2006.01)
*B65G 15/42* (2006.01)
(Continued)

(52) U.S. Cl.
CPC ............... *F26B 3/30* (2013.01); *B65G 15/42* (2013.01); *B65G 39/16* (2013.01); *F26B 3/04* (2013.01);
(Continued)

(58) Field of Classification Search
CPC .. F26B 3/30; F26B 3/04; F26B 13/103; F26B 15/18; F26B 15/2502; F26B 25/06;
(Continued)

(56) References Cited

U.S. PATENT DOCUMENTS 1,329,082 A 1/1920 Irwin
1,407,081 A 2/1922 Parkes
(Continued)

FOREIGN PATENT DOCUMENTS

CN 103015103 A 4/2013
DE 4236123 C1 2/1994
(Continued)

OTHER PUBLICATIONS

Rhodefer, B., Google search results: "Re: Need AC zero cross detection circuit"; Newsgroups sci.electronics.de; Aug. 25, 1997; retrieved from Internet on Apr. 23, 2003, 2 pages.
(Continued)

*Primary Examiner* — Stephen M Gravini
(74) *Attorney, Agent, or Firm* — UB Greensfelder LLP

(57) ABSTRACT

The present invention provides a conveyor belt tracking system for a dryer having a web of a mesh material having a protrusion extending along the length proximal one lateral edge and above a flat surface and a first generally cylindrical roller having a three-tiered slot for receiving the protrusion and two flanking shallow tracks for receiving base flanges.

20 Claims, 4 Drawing Sheets

Related U.S. Application Data continuation of application No. 17/031,210, filed on Sep. 24, 2020, now Pat. No. 11,226,156, which is a continuation of application No. 16/173,030, filed on Oct. 29, 2018, now Pat. No. 10,794,631, which is a continuation of application No. 15/265,538, filed on Sep. 14, 2016, now Pat. No. 10,113,795, which is a continuation-in-part of application No. 15/194,035, filed on Jun. 27, 2016, now Pat. No. 9,939,198.

(60) Provisional application No. 62/248,862, filed on Oct. 30, 2015, provisional application No. 62/185,093, filed on Jun. 26, 2015.

(51) Int. Cl.
| | |
|---|---|
| *B65G 39/16* | (2006.01) |
| *F26B 3/04* | (2006.01) |
| *F26B 13/10* | (2006.01) |
| *F26B 15/12* | (2006.01) |
| *F26B 15/18* | (2006.01) |
| *F26B 21/08* | (2006.01) |
| *F26B 21/10* | (2006.01) |
| *F26B 21/12* | (2006.01) |
| *F26B 25/02* | (2006.01) |
| *F26B 25/06* | (2006.01) |

(52) U.S. Cl.
CPC ............ *F26B 13/103* (2013.01); *F26B 15/12* (2013.01); *F26B 15/18* (2013.01); *F26B 21/08* (2013.01); *F26B 21/10* (2013.01); *F26B 21/12* (2013.01); *F26B 25/02* (2013.01); *F26B 25/06* (2013.01)

(58) Field of Classification Search
CPC .......... F26B 21/08; F26B 21/10; F26B 21/12; F26B 15/12; B65G 15/42
USPC .......................................................... 34/273
See application file for complete search history.

(56) References Cited

U.S. PATENT DOCUMENTS

| | | | |
|---|---|---|---|
| 2,184,905 A | 12/1939 | Brintnall | |
| 2,432,525 A | 12/1947 | Kruse | |
| 2,512,128 A | 6/1950 | Albright | |
| 3,512,989 A | 5/1970 | Smith | |
| 3,732,435 A | 5/1973 | Strandberg, Jr. et al. | |
| 3,928,703 A | 12/1975 | Cook | |
| 3,943,842 A | 3/1976 | Bills et al. | |
| 4,086,393 A | 4/1978 | Hart | |
| 4,112,587 A * | 9/1978 | Sundman ................. | D21C 9/18 34/388 |
| 4,192,751 A | 3/1980 | Henton et al. | |
| 4,261,288 A | 4/1981 | Jurascheck et al. | |
| 4,380,191 A | 4/1983 | Gallegos et al. | |
| 4,385,452 A | 5/1983 | Deschaaf et al. | |
| 4,451,357 A | 5/1984 | LaVigne | |
| 4,491,610 A | 1/1985 | Mansour | |
| 4,495,021 A | 1/1985 | Goldsworthy | |
| 4,498,941 A | 2/1985 | Goldsworthy | |
| 4,520,750 A | 6/1985 | Mansour | |
| 4,565,282 A | 1/1986 | Olsson et al. | |
| 4,567,673 A | 2/1986 | Bohnensieker | |
| 4,698,767 A | 10/1987 | Wensel et al. | |
| 4,867,301 A | 9/1989 | Roinestad et al. | |
| 4,974,341 A * | 12/1990 | Vinas ....................... | D06B 3/28 34/640 |
| 5,021,940 A | 6/1991 | Cox et al. | |
| 5,023,429 A | 6/1991 | Bailey et al. | |
| 5,062,220 A * | 11/1991 | Keilhack ................ | F26B 13/103 34/629 |
| 5,093,963 A | 3/1992 | Farrington et al. | |
| 5,117,562 A | 6/1992 | Dulay et al. | |
| 5,144,108 A | 9/1992 | Passarotto | |
| 5,154,010 A * | 10/1992 | Klemm ..................... | F26B 3/00 34/68 |
| 5,218,908 A | 6/1993 | Whitfield | |
| 5,225,880 A | 7/1993 | Shehata et al. | |
| 5,239,613 A | 8/1993 | Motev et al. | |
| 5,279,697 A | 1/1994 | Peterson et al. | |
| 5,361,515 A | 11/1994 | Peremyschev | |
| 5,375,721 A | 12/1994 | LaVigne | |
| 5,426,280 A | 6/1995 | Smith | |
| 5,447,003 A | 9/1995 | Warren et al. | |
| 5,489,981 A | 2/1996 | Killpatrick et al. | |
| 5,538,562 A | 7/1996 | Misaki | |
| 5,634,281 A | 6/1997 | Nugent | |
| 5,651,191 A | 7/1997 | Walunas et al. | |
| 5,655,312 A | 8/1997 | Sevcik | |
| 5,669,155 A | 9/1997 | Hughes et al. | |
| 5,797,598 A | 8/1998 | Marschke et al. | |
| 5,813,134 A | 9/1998 | Min et al. | |
| 5,828,178 A | 10/1998 | York et al. | |
| 5,852,881 A | 12/1998 | Kuroda et al. | |
| 5,908,000 A | 6/1999 | Spychalla et al. | |
| 5,937,535 A | 8/1999 | Hoffman, Jr. et al. | |
| 6,026,588 A | 2/2000 | Clark et al. | |
| 6,161,304 A | 12/2000 | Iaccino et al. | |
| 6,182,375 B1 | 2/2001 | Banerjee | |
| 6,340,225 B1 | 1/2002 | Szlucha | |
| 6,388,690 B1 | 5/2002 | Kurachi | |
| 6,456,826 B1 | 9/2002 | Toskala et al. | |
| 6,701,638 B1 * | 3/2004 | Polato ....................... | C14B 1/58 34/619 |
| 6,751,888 B2 | 6/2004 | Lueckenbach | |
| 6,760,981 B2 | 7/2004 | Leap | |
| 6,779,279 B2 | 8/2004 | Lee et al. | |
| 7,073,274 B2 | 7/2006 | Yoshida | |
| 7,568,971 B2 | 8/2009 | Shefet et al. | |
| 7,850,820 B2 | 12/2010 | Scherb et al. | |
| 8,528,231 B2 | 9/2013 | Kim et al. | |
| 9,061,829 B2 | 6/2015 | Salsone et al. | |
| 9,671,166 B2 | 6/2017 | Plavnik et al. | |
| 9,939,198 B2 | 4/2018 | Hoffman, Jr. et al. | |
| 10,113,795 B2 * | 10/2018 | Hoffman, Jr. ........... | F26B 15/12 |
| 10,168,098 B2 | 1/2019 | Ostermann | |
| 10,272,442 B2 | 4/2019 | Snyder et al. | |
| 10,533,799 B2 * | 1/2020 | Triglia, Jr. ............... | F26B 15/18 |
| 10,648,731 B2 * | 5/2020 | Grünewald ............... | C08F 2/00 |
| 10,724,794 B2 * | 7/2020 | Niklaus ..................... | F26B 13/06 |
| 10,794,631 B2 * | 10/2020 | Hoffman, Jr. ............ | F26B 21/12 |
| 10,969,172 B2 | 4/2021 | Blomquist | |
| 11,226,156 B2 * | 1/2022 | Hoffman, Jr. ............ | F26B 21/12 |
| 11,740,017 B2 * | 8/2023 | Hoffman, Jr. ............ | F26B 15/18 34/633 |
| 2003/0042248 A1 | 3/2003 | Witt et al. | |
| 2005/0209936 A1 | 9/2005 | Guy | |
| 2007/0144033 A1 | 6/2007 | Kocjan et al. | |
| 2007/0193056 A1 | 8/2007 | Switalski | |
| 2014/0047731 A1 | 2/2014 | Quirk et al. | |
| 2015/0291366 A1 | 10/2015 | Cumberlege | |
| 2016/0025411 A1 | 1/2016 | Plavnik et al. | |
| 2017/0030645 A1 | 2/2017 | Hoffman, Jr. et al. | |
| 2017/0067687 A1 | 3/2017 | Hoffman, Jr. et al. | |
| 2019/0137176 A1 | 5/2019 | Hoffman, Jr. et al. | |
| 2021/0003344 A1 | 1/2021 | Hoffman, Jr. et al. | |
| 2021/0055050 A1 | 2/2021 | Triglia, Jr. | |
| 2022/0243983 A1 | 8/2022 | Hoffman, Jr. et al. | |
| 2024/0003622 A1 * | 1/2024 | Hoffman, Jr. ........... | F26B 25/06 |

FOREIGN PATENT DOCUMENTS

| | | |
|---|---|---|
| FR | 2614546 A1 | 11/1988 |
| GB | 2249824 A | 5/1995 |
| GB | 2357827 A | 7/2001 |
| IT | 1316230 B1 | 4/2003 |

(56) References Cited

FOREIGN PATENT DOCUMENTS

WO          9319337 A2     9/1993
WO    2011042012 A1     4/2011

OTHER PUBLICATIONS

M&R Equipment, Inc.; Web page for "Product Index: Textile Printing: Mini Sprint" printer; retrieved from Internet on May 23, 2005, 2 pages.

M&R Equipment, Inc.; Web page for "Product Index: Textile Printing: Sprint 2000" printer retrieved from Internet on May 23, 2005, 2 pages.

M&R Printing Equipment, Inc.; Web page for "Product Index: Textile Printing: Sprint 2000 HO" printer; retrieved from Internet on May 23, 2005, 2 pages.

M&R Sales & Service, Inc.; Product Catalog for Textile Screen Printing Equipment: Mini Sprint, Sprint 2000, and Sprint 2000 HO models; pp. 7-8; published 2001, 3 pages.

M&R Sales & Service, Inc.: Product Catalog for Textile Screen Printing Equipment: Sprint Modular Textile Gas Dryer and Sprint SS Modular Textile Gas Dryer; pp. 23-24; undated, 3 pages 1901.

\* cited by examiner

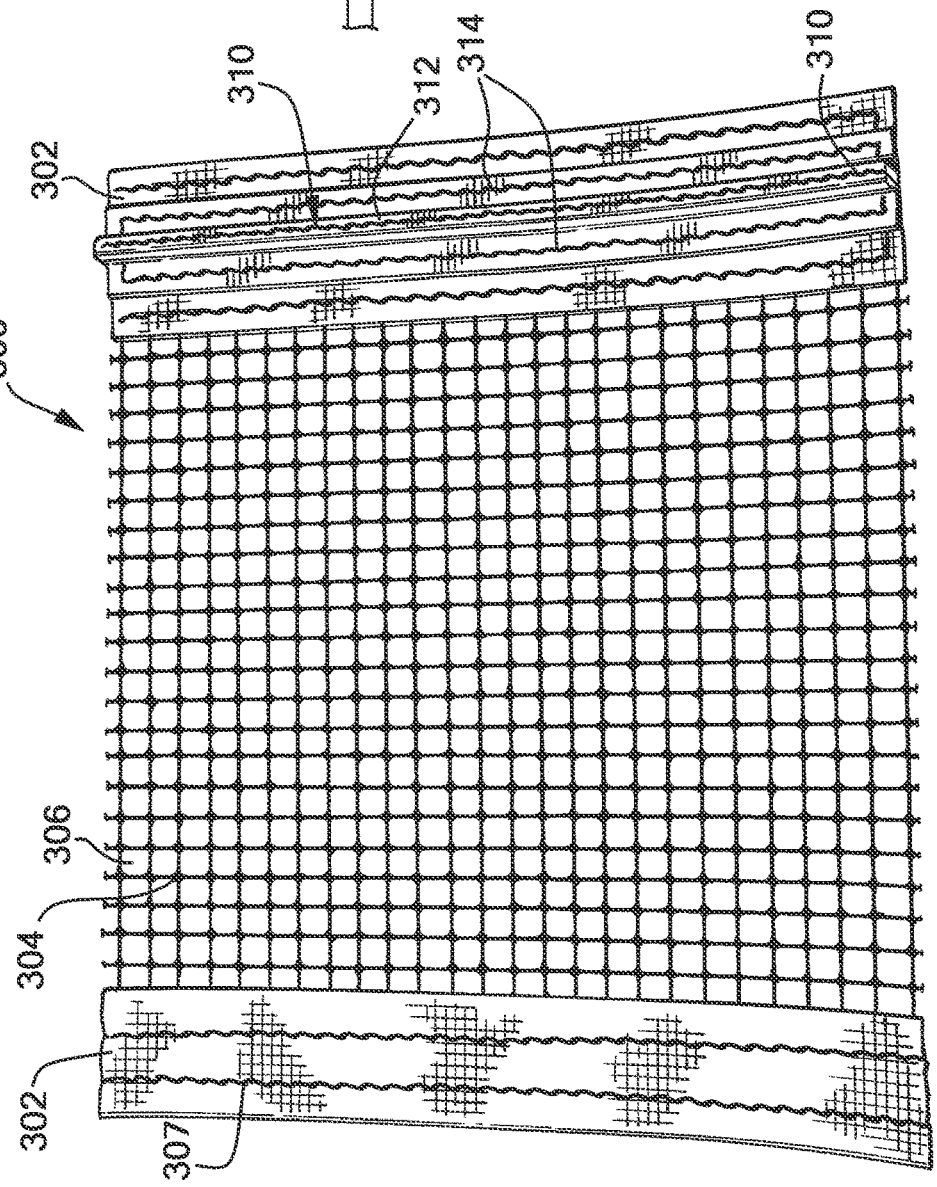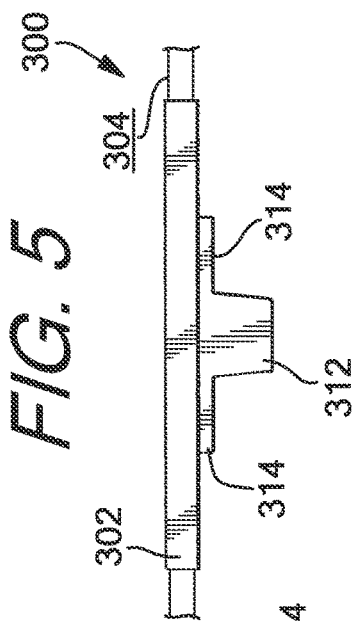

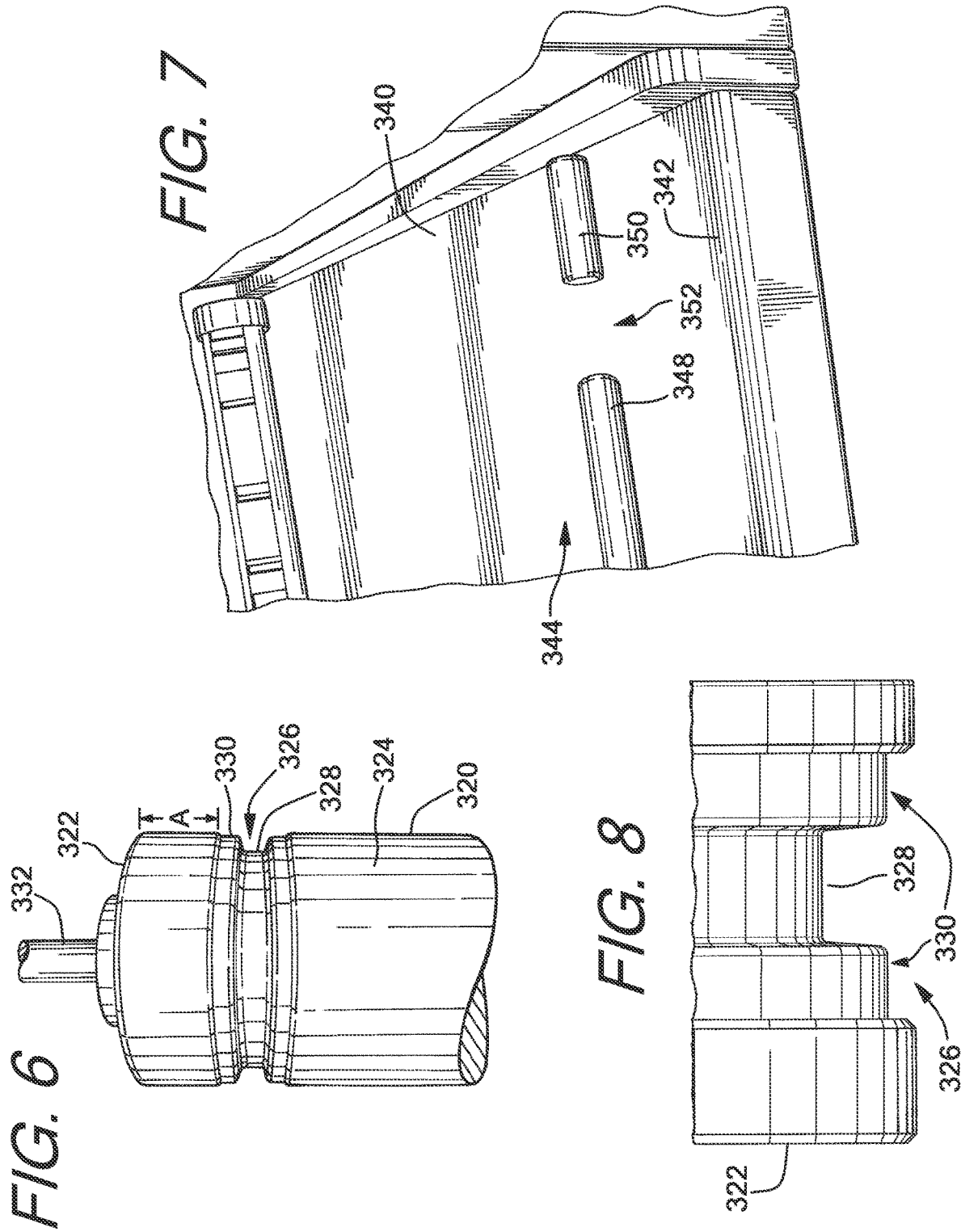

DRYER CONVEYOR BELT TRACKING SYSTEM

CROSS-REFERENCE TO RELATED APPLICATIONS

This application is a continuation of U.S. application Ser. No. 17/546,751 filed on Dec. 9, 2021, which is a continuation of U.S. application Ser. No. 17/031,210 filed on Sep. 24, 2020, now U.S. Pat. No. 11,226,156, which is a continuation of U.S. application Ser. No. 16/173,030 filed on Oct. 29, 2018, now U.S. Pat. No. 10,794,631, which is a continuation of U.S. application Ser. No. 15/265,538 filed Sep. 14, 2016, now U.S. Pat. No. 10,113,795, which is a continuation-in-part of U.S. application Ser. No. 15/194,035 filed on Jun. 27, 2016, now U.S. Pat. No. 9,939,198, which claims priority to U.S. Provisional Patent Application No. 62/185,093 filed on Jun. 26, 2015, and U.S. Provisional Patent Application No. 62/248,862 filed on Oct. 30, 2015, all of which are incorporated in their entirety herein by reference and made a part hereof.

FEDERALLY SPONSORED RESEARCH OR DEVELOPMENT

Not applicable.

TECHNICAL FIELD

The present application is directed to a dryer belt control system for a textile dryer.

BACKGROUND OF THE INVENTION

Indicia applied to articles of clothing and other textiles have become very popular. Fanciful indicia, such as slogans, logos, college names, sports team names and logos, and sayings are commonplace.

Indicia are printed using screen printing machines, with one or more colors. Typically, a screen printing machine has at least one station to print each color. Each station generally includes a printing head, which supports a single screen, the ink, and a mechanism for applying the ink to the textile or substrate. The textile to be printed travels between printing stations. The textile is typically carried by a metal pallet, pallet support, flat bed, or platen. Common printing machines are of the turret-type, or are oval or linear in configuration.

Some printing machines incorporate ink curing stations. Other operations employ separate dryers. A dryer has two primary components: a conveyor system and a heating system. Typically, the drying operation includes an operator setting the internal dryer temperature and the conveying speed to achieve the desired drying characteristics. Commonly known mechanisms are employed to determine or read the ambient temperature in the dryer, which allows the operator to adjust the conveyor speed to compensate to achieve the desired drying.

Numerous inks are available. Such inks include water based inks, sublimation inks, and plastisol. The ink is cured or gelled onto the substrate to a critical temperature. The temperature during the curing process must be kept within a suitable window depending on the ink's curing properties, typically between 125 and 450 degrees Fahrenheit. For example, plastisols must reach a temperature of 320 degrees Fahrenheit. In the ranges below 320 degrees and above 350 degrees, the plastisol will not properly set, resulting in cracking, or it may become liquified. Moreover, if a dye in the textile is overheated, it will migrate, or the textile or substrate may scorch or burn, increasing waste and production costs.

To solve this issue, dryers such as disclosed in U.S. Pat. No. 5,937,535 were developed to sense and control the drying process. Dryers are typically electric or gas-powered, use a great deal of energy, and are essentially a heat sink. Commonly assigned U.S. Patent Publication No. 2014/0047731, which is incorporated herein by reference and made a part hereof, discloses a speed control system for a dryer with an improved belt control system that reduces the amount of energy the dryer uses on startup, thereby reducing energy consumed in the drying process, and cutting costs of operation.

Another challenge in using dryers is the manner of making a belt track through the use of crowned rollers and skewing the belt in one direction or another by adjusting bolts until the belt is centered. This manner requires frequent adjustments and readjustments, and can also result in the edges of belts being destroyed because the belt fell out of proper alignment requiring belt replacement. Some belt tracking systems in current use are provided in the dryer tunnel which has the undesired effect of reducing the useable width of the belt ultimately reducing throughput. In one preferred form of the invention, the dryer is a textile dryer, but could be a dryer for other items.

Applicant, M&R Printing Equipment, Inc.'s, Roselle, Illinois, line of dryers, more particularly conveyor dryers, and even more particularly conveyor dryers for textiles. Suitable dryers include infrared electric textile dryers and propane and natural gas conveyor dryers. M&R has designed and manufactured several dryers, the TRANSFORMER™, BLU-FLASH™, FUSION™, RADICURE™, Sprint 3000, Vitran systems. Belt width similarly can vary. Common widths are between 24" to 87" and conveyer lengths ranging from about 82" or longer.

BRIEF DESCRIPTION OF THE DRAWINGS

To understand the present invention, it will now be described by way of example, with reference to the accompanying drawings in which:

FIG. 4 is a top plan view of a conveyor belt with a belt tracking protrusion of a belt tracking system of the present invention.

FIG. 5 is an enlarged side elevation view of a belt tracking structure on a conveyor belt.

FIG. 6 is a perspective view of a conveyor belt drive roller or idler roller of a belt tracking system of the present invention.

FIG. 7 is a perspective view of an entryway into the dryer of a belt tracking system of the present invention.

FIG. 8 is an enlarged view of the drive roller or idler roller of the belt tracking system.

DETAILED DESCRIPTION

Figure 1:
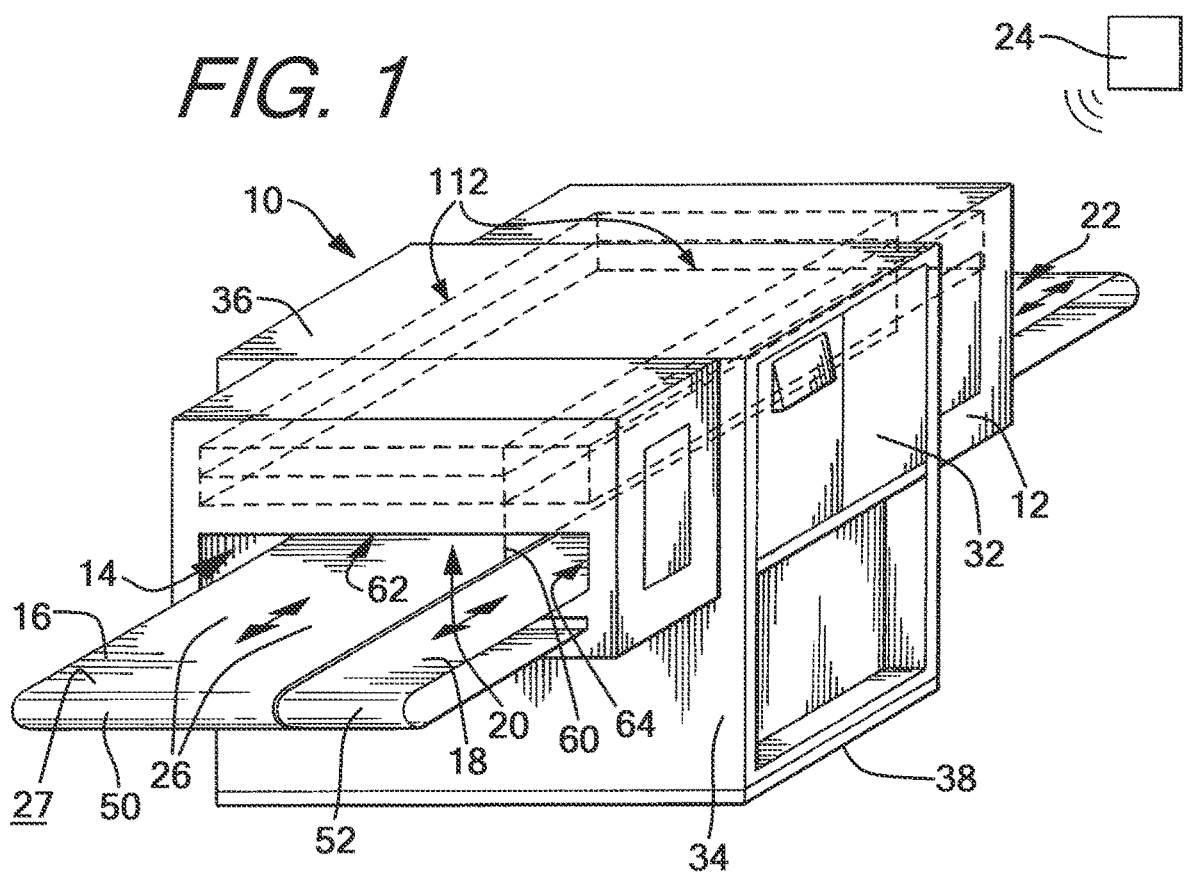
FIG. 1 is a perspective view of a exemplary textile dryer having multiple belts and/or a multiple zones of ambient conditions.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a conveyor belt tracking system for a dryer having a conveyor belt. The term "tracking" means the speed of the conveyor belt is constant across a width of the conveyor belt so that the speed of the belt at each opposed lateral edge is the same. This ensures the belt will move through the dryer without damage caused when one edge of the belt moves at a different speed from the other edge causing the belt to skew and to come into contact with portions of the dryer causing a shredding or cutting of the belt. The tracking device overcomes difficulties in using crowned rollers which cannot be reversed in directions without realigning the belt. This is a time consuming process that increases the cost of drying textiles.

The tracking system is useful with a conveyor belt system and particularly with forced air dryers employing a conveyor belt system. The tracking system will be explained with reference to a textile dryer shown in FIGS. 1 and 2, but it should be understood the tracking system could be used with other conveyor systems and other textile dryers.

Figure 2:
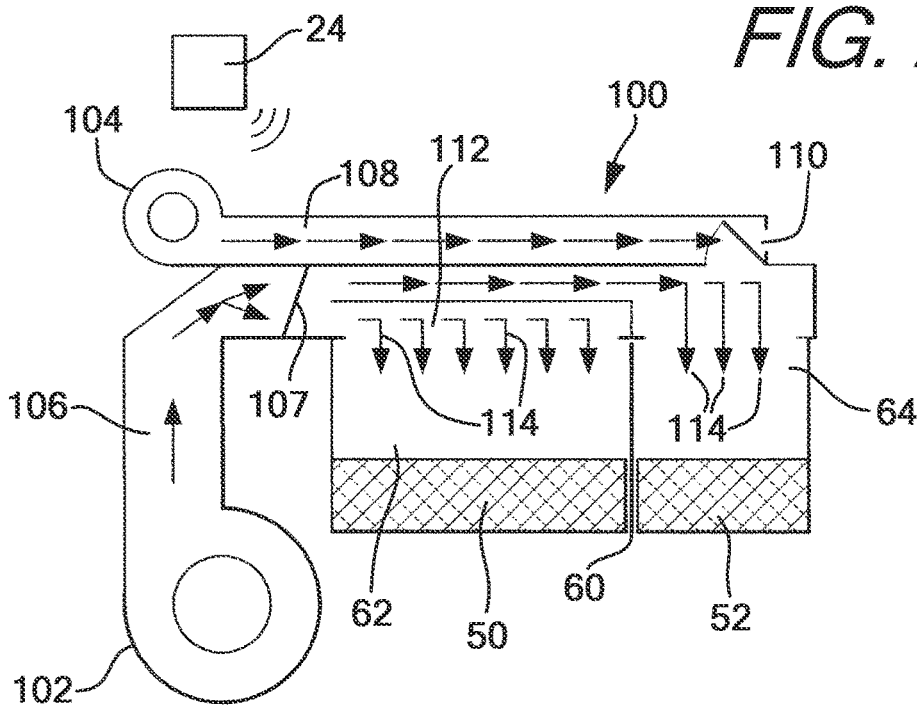
FIG. 2 is a schematic view of an air flow diagram for the dryer of FIG. 1.

FIGS. 1 and 2 show a dryer assembly 10 having a housing 12 defining a chamber 14 therein and having a first conveyor system 16 and a second conveyor system 18 each extending through an infeed or entrance 20 into the housing and an outfeed or exit 22 from the housing. The terms "entrance" and "infeed" shall be used interchangeably as will the terms "exit" and "outfeed." The housing 12 is formed of opposed side walls 32, opposed end walls 34, a top wall 36 and a bottom wall 38. Such walls and panels are generally constructed of sheet metal and optionally with a double wall construction surrounding a layer of insulative material to assist in keeping the outer walls relatively cool to the touch.

The chamber 14 has an ambient condition defined by physical characteristics such as temperature, humidity, pressure, air flow rate(s), exposure to electromagnetic radiation of a particular frequency such as ultra violet (UV) or infrared (IR), and other measurable physical conditions. An operator using a controller 24 having a suitable graphical user interface (GUI) can enter a desired value or a range of values for each physical condition used to constitute the ambient condition. The controller 24 will maintain the conditions in the chamber to define the desired ambient condition. The controller 24 has a processor, a memory, and computer readable instructions in the memory when executed by the processor takes the necessary steps to control the operation of the dryer to achieve a desired goal. The dryer is connected to other controls on valves, and blowers, for example, to moderate the flow rate, temperature, humidity of forced air supplied under pressure into and out of the chamber to maintain the set conditions. Additionally, the controller 24 is connected to a sensor or multiple sensors inside the chamber or dryer to measure and generate a signal representative of a physical characteristic such as temperature, humidity, air flow rate, etc., and sending the signal to the controller 24. As will be discussed below in reference to FIG. 3, the controller 24 compares the measured physical characteristic with the user inputted value or range of values and makes adjustments to the inputs or operating conditions to bring the measured characteristic within the desired range of values. The controller 24 can be electrically coupled to the sensors and controls by a physical connection such as a wire, through a wireless connection or a combination of wired and wireless connections. Wireless connections are well known to those of skill in the art and include any near field communication technology, Bluetooth, radio frequency and others.

In a preferred form of the invention, the first conveyor system 16 and the second conveyor system 18 extend parallel to one another, more preferably are coextensive (of the same length), and most preferably are coterminous (each of the opposed ends are in registration). Each of the first conveyor and the second conveyer systems 16,18 are mounted or journalled for reciprocal translational motion as shown by arrows 26 and each have an upper surface 27 for supporting objects and in exposure to the ambient condition of the chamber. Preferably, the upper surfaces are generally coplanar. In one form of the invention, the objects are freshly printed textiles where the ink is still wet or uncured and the ambient condition is set to dry the ink over a period of time the textiles are present in the chamber (dwell time). The dryer 10 shown has two conveyor systems but more than two conveyors such as from 2 to 5 or more can be provided without departing from the scope of the present invention. Each of the conveyors will be associated with a zone having an independently set ambient condition.

Each of the conveyor systems 16,18 preferably has a continuous belt 50,52 respectively supported on a frame (support rails), with the belts 50,52 having a highly porous (or open mesh) surface area, such as a screen, mounted around (entrained) at least two rollers supported by the frame as is well known in the art. One of the rollers is a drive roller and the other roller is an idler roller. The driver roller is driven by a motive source such as an electric motor. The preferred belt is a heat-resistant, Teflon® coated fiberglass. The belts 50,52 are driven by the drive roller in the direction indicated by the arrows 26 so that the objects resting thereon, such as textiles, pass through the chamber 14 between the side walls 32 of housing 12 from the entrance 20 to the exit 22. FIG. 1 shows the belt 50 has a width greater than a width of the second belt 52 but the belts could be of the same or similar widths without departing from the present invention. In a preferred form of the invention a ratio of the widths of the second belt 52 to the first belt 50 is from 1:1 to 1:10, more preferably 1:1.1 to 1:5, and even more preferably from 1:1.5 to 1:3.

The continuous belts 50,52 of each of the conveyor systems 16,18 should be of sufficient width to carry objects of varying size with the wide belt 50 capable of supporting large textiles while the narrow belt 52 is capable of supporting smaller objects. The length of belts 50,52 are dictated by the size of dryer 10, but this length must be taken into consideration when independently setting the speed the belts 50,52 travel through housing 12. That is, a sufficient dwell time within the dryer 10 must be allowed for each printed article to reach the desired condition. The conveyors 50,52 generally extend beyond the entrance and exit openings 20,22 to points outside the housing 12.

In a preferred form of the invention, the dryer will use a belt tracking system on the drive roller or the idler roller on each of the conveyors so that the lateral edges of each conveyor move at the same speed. The belt tracking also allows the conveyor belts to change directions without causing the belt to lose tracking causing textiles to shift on the belt due to the lateral edges of the belt moving at different speeds. This overcomes a problem using crowned rollers which cannot reverse directions and maintain proper tracking without realigning the belt.

FIG. 1 shows a separation wall 60 extending longitudinally within the housing 12 to divide the chamber 14 into a first zone 62 and a second zone 64 with each zone having an ambient condition having physical conditions that can be independently set by the user with the GUI of the controller 24. The separation wall extends substantially from the entrance 20 to the exit 22 of the housing and is positioned between the first belt and the second belt 50,52 so that the first belt 50 extends through the first zone 62 and the second belt extends through the second zone 64. Preferably, the separation wall 60 is retractable from being fully deployed along substantially a full length of the housing to an intermediate position being partially deployed along a portion of the length of the housing or in a fully collapsed condition where the chamber has a single ambient condition. The separation wall 60 can be deployed and retracted manually or by a mechanism powered by a motive force such as a servo motor. The separation wall 60 can be stowed, in an extended condition or a collapsed condition, above or below the surface of the conveyor belts and can be moved vertically, up or down, into the desired position. The separation wall can also be stowed in the chamber in a collapsed condition or an extended condition and moved horizontally into position in a direction transverse to the belt direction or in a direction parallel to the belt direction.

The belt tracking system allows for the two conveyors to have a small spacing between their respective lateral edges. A small spacing can be from less than one inch to about 4 inches, more preferably from about 1 inch to about 3 inches, or any range or combination of ranges therein.

FIG. 2 shows an air distribution system 100 of the dryer 10 having a hot air blower 102, a fresh air blower 104, a hot air conduit 106, a hot air valve 107, a fresh air conduit 108 and a fresh air valve 110. Hot air is supplied under pressure to the first zone 62 and a mixture of hot air and fresh air is supplied to the second zone 64. The mixing percentages of the hot air and fresh air can be controlled through the fresh air valve 110 which is connected to the controller 24. Additionally, the hot air blower 102 and the fresh air blower 104 each has a control for varying the flow rate of heated or fresh air and the temperature of the air to achieve the desired temperature of the air. The flow of heated air to the first zone or a combination of heated and fresh air to the second zone is provided through a distribution channel 112 connected to a plurality of air knives 114 extending longitudinally above each belt and having separate channels horizontally spaced from one another to provide an even temperature across the length and width of the belts 50,52.

To operate the dryer a user or operator will select the desired physical characteristics to be maintained within the chamber or in zone 1 and zone 2, and additional zones if present, of the chamber. For example, the user will select a desired temperature or range of temperatures, humidity, air flow rate, conveyor belt speed, dwell time of an object to spend in the chamber, and the frequency of electromagnetic radiation if any to pass through the chamber. The dryer is powered up and objects are placed on the conveyor belts by an operator at the infeed and removed by an operator at the outfeed. Typically, textiles that have been printed with ink are placed in the dryer to dry or cure the ink. The ink can be dried or cured using the heated air but the ink could be cured by exposing the textiles to electromagnetic radiation such as UV or IR light. Each zone has its own ambient condition so that objects having differing sizes, differing initial conditions or differing end conditions, for example, can be achieved using the dual or multiple zones having optimal conditions for the objects that pass through the dryer.

Figure 3:
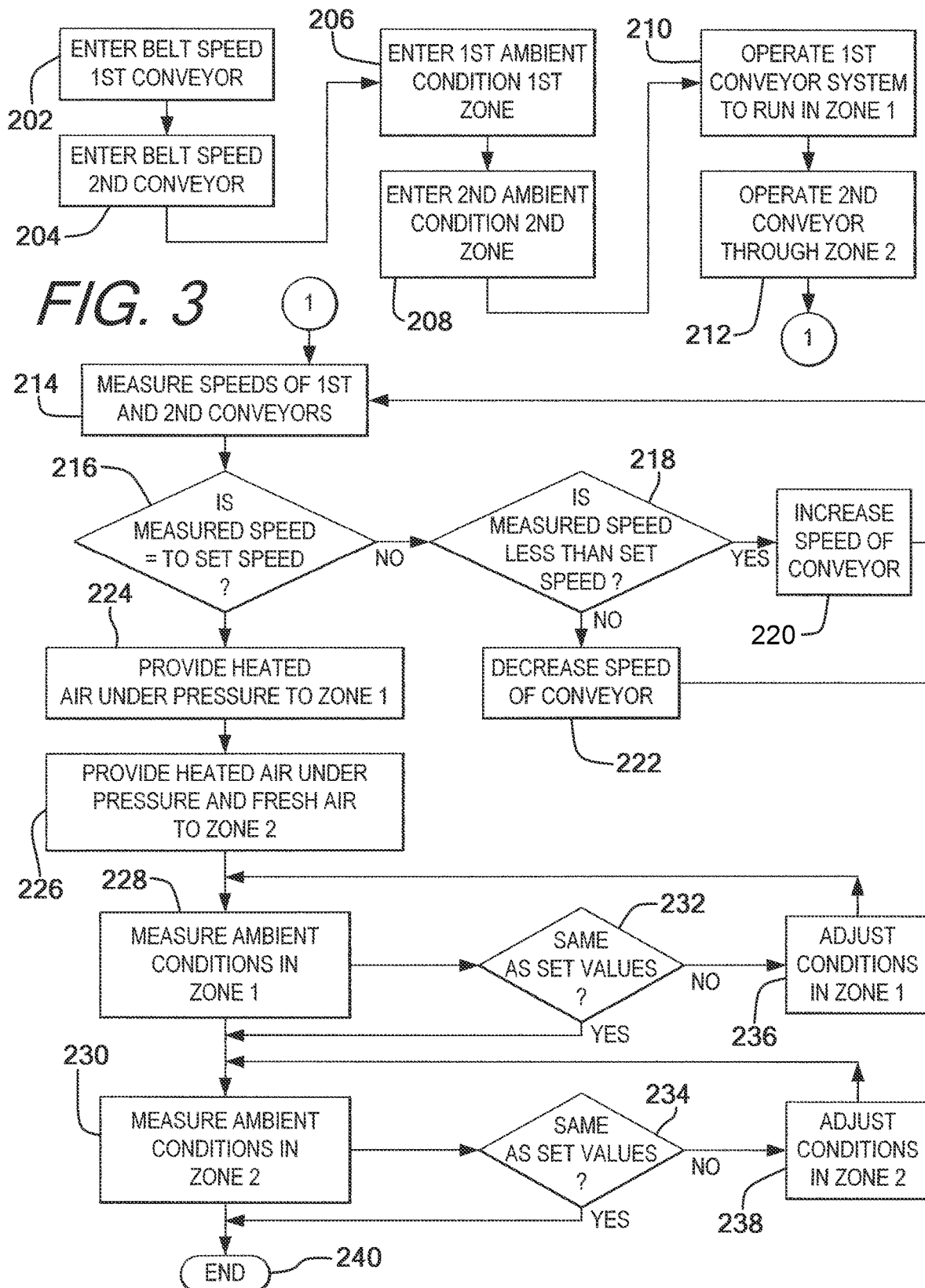
FIG. 3 is a flowchart of a method of using a textile dryer of the present invention.

FIG. 3 shows a flowchart 200 of an exemplary method of using the textile dryer of the present invention. The steps do not have to be carried out in the exact order as shown. In steps 202,204 an operator will enter the desired belt speed of the first conveyor system and of the second conveyor system using the graphical user interface (GUI) of the controller. The operator could also enter the desired dwell time and allow the controller to calculate the belt speed and direction. The controller will set and monitor the speed of the belts to achieve the desired dwell times to cure the ink. Each of the conveyor belts can be run in a single direction or back and forth in two directions to achieve the desired dwell time. Additionally, in one preferred form of the invention, the operator can specify the side of the dryer to initially load the textiles to be dried, and the end of the dryer where the cured textiles can be removed. The entrance side and the exit sides of the textile can be on the same side or different sides of the dryer.

In steps 206,208 an operator using the GUI will enter the physical conditions to define the first ambient condition of a first zone and the physical conditions to define a second ambient condition of a second zone. It is not necessary to provide heat to both zones—one zone can be heated while the other zone is unused and no heated air is supplied. Thus, the dryer can be operated as a single chamber with two belts operating at the same speed to act as a single full-sized dryer, or one conveyor can operate while the other conveyor is stationary to operate as a single dryer of lesser size than the full-sized dryer, and both conveyors can be operated through two different zones to act as two dryers.

Once the operating conditions of the dryer are entered, an operator using the controller can, in steps 210,212, initiate the running of the first conveyor through the first zone and the second conveyor through the second zone. Periodically, the speed of each conveyor is measured 214 and reported to the controller which compares at step 216 the actual speed of the conveyors with the set speed. If the measured speed is not equal then it is determined at step 218 whether the measured speed is less than the set speed. If so in step 220 the conveyor speed is increased and if not in step 222 the conveyor speed is decreased, and this process is repeated until the desired conveyor speed is reached. The controller in step 224 provides a flow of heated air to the first zone and in step 226 provides a mixture of heated air and fresh air to zone 2. Thus, two ambient zones can be maintained with a single blower and a single heater.

Periodically, in steps 228,230 the physical conditions that define the ambient conditions in zone 1 and zone 2 are measured and compared in steps 232,234. Adjustments are made in steps 236,238 by, for example, altering the flow rate of heated air or fresh air or the temperature or humidity of the air supplied and the physical conditions are measured again until the desired conditions are met in zone 1 and zone 2. The dryer is operated until the task is complete 240 and the dryer and its associated systems can be shut down.

The dryer can be used to simultaneously dry batches of textiles having inks of different curing conditions. For example, one belt can be operated in the first zone to dry an ink applied to a textile in a screen printing operation while the second belt can be operated in the second zone to dry an ink applied in a direct-to-garment printing operation. Thus, screen printers who use both screen printing and direct-to-garment printing presses in a single location can use a single dryer to cure both types of textiles simultaneously.

FIGS. 4 and 5 show a dryer belt 300 of a web of porous or mesh material having opposed lateral edges 302, a length, a generally flat surface 304 and a plurality of holes 306 through the web to allow for the passage of heated air. Each lateral edge has a coating material 307 that extends along the length of the belt and fills in the holes 306 to strengthen this lateral portion of the web for contact with the drive and idler rollers. Along one lateral edge, a strip of material 310 is secured to the web over the coating material 307. Preferably the strip is sewn to the belt. The strip has a pair of base flanges 314 flanking a central peak 312. The base flanges are generally rectangular in vertical cross-section dimension and the central peak 312 is generally trapezoidal in vertical cross-section dimension. The central peak is for guiding the conveyor belt and the flanking flanges 314 increases frictional engagement with either the drive roller or the idler roller, as applicable. Thus, the flanking flanges 314 provide the frictional engagement between the belt and the drive roller or the idler roller so that the belt moves in response to the drive roller rotation. The base flanges extend above the generally flat surface 304 of the web by a first distance and the peak extends above the surface by a second distance which is greater than the first distance.

FIGS. 6 and 8 show a first generally cylindrical roller 320 having a circumference, opposed lateral edges 322 and a generally smooth surface 324. A three-tiered slot 326 extends about the circumference and is spaced axially inwardly from a lateral edge 322 by a distance A and extends radially inwardly of the smooth surface. It is desirable to place the groove axially inwardly so the outermost lateral edge of the belt is not contacting the outermost end of the roller to reduce damage to the belt from contacting stationary portions of the dryer proximate the outer edge of the roller. The slot has a central deep track 328 for receiving the peak 312 and two flanking shallow tracks 330 for receiving the base flanges 314. This allows the belt to maintain a constant distance above the surface of the rollers across the entire width of the conveyor even when one lateral edge has the bead and the other does not have the bead.

FIG. 7 shows a surface 340 that is positioned between the rollers and within the loop of the belt such that the interior surface of the belt faces the surface 340. The surface 340 has an entry point 342 to the dryer, an exit point (not shown) and opposed lateral edges 344. A support member 346 is mounted on the surface 340 and has a first member 348 and a second member 350 spaced from the first member with a gap or notch 352 therebetween. The gap 352 accommodates the passage of the strip of material 310. In a preferred form of the invention, the second member 350 has a length roughly equal to the distance A so that the notch is in alignment with the three-tiered slot 326. In a preferred form of the invention, two support members are provided with each support member being associated with a roller and positioned proximal thereto.

The terms "first," "second," "upper," "lower," "front," "back," etc. are used for illustrative purposes only and are not intended to limit the embodiments in any way. The term "plurality" as used herein is intended to indicate any number greater than one, either disjunctively or conjunctively as necessary, up to an infinite number. The terms "attached," "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings.

While the specific embodiments have been illustrated and described, numerous modifications come to mind without significantly departing from the spirit of the invention, and the scope of protection is only limited by the scope of the accompanying Claims.

What is claimed is:

1. A multi-zone textile dryer comprising:
   a housing having a first side wall, a second opposing side wall, a first end wall, a second opposing end wall, a bottom wall and a top wall, the housing having a first opening at a first end and a second opening at an opposing second end;
   a separation wall extending longitudinally within the housing dividing an interior of the housing into a first zone and a second zone;
   a first conveyor having a first belt extending from the first opening of the housing through the first zone and to the second opening of the housing, the first belt having a horizontal surface for receiving articles to be dried, and a second conveyor having a second belt extending from the first opening of the housing through the second zone and to the second opening of the housing, the second belt having a horizontal surface for receiving articles to be dried, wherein the first belt is parallel to and coextensive with the second belt;
   an air distribution system including:
      a hot air blower for supplying hot air into the first zone and the second zone; and,
      a fresh air blower for supplying fresh air into the second zone.

2. The multi-zone textile dryer of claim 1 wherein the air distribution system includes a hot air valve for varying an amount of hot air supplied by the hot air blower to the first zone and second zone.

3. The multi-zone textile dryer of claim 2 wherein the air distribution system includes a fresh air valve for varying an amount of fresh air supplied to the second zone.

4. The multi-zone textile dryer of claim 1 further including a first plurality of air knives in the first zone and a second plurality of air knives in the second zone.

5. The multi-zone textile dryer of claim 4 wherein each of the first plurality of air knives are horizontally spaced from another of the first plurality of air knives.

6. The multi-zone textile dryer of claim 1 wherein the separation wall is retractable.

7. The multi-zone textile dryer of claim 1 wherein the side walls of the housing are formed from sheet metal having double walled construction surrounding a layer of insulation.

8. The multi-zone textile dryer of claim 1 wherein the first first belt and second belt are coterminous.

9. The multi-zone textile dryer of claim 3 further including a controller for maintaining physical conditions in the housing.

10. The multi-zone textile dryer of claim 9 wherein the controller controls the hot air valve.

11. The multi-zone textile dryer of claim 9 wherein the controller controls the fresh air valve.

12. The multi-zone textile dryer of claim 8 wherein the controller controls a speed of the first belt and a speed of the second belt.

13. The multi-zone textile dryer of claim 9 further comprising a plurality of sensors in the housing providing signals to the controller.

14. The multi-zone textile dryer of claim 13 wherein a first one of the plurality of sensors provides an indication of a temperature in the first zone and a second one of the plurality of sensors provides an indication of a temperature in the second zone.

15. The multi-zone textile dryer of claim 14 wherein the controller compares sensed physical characteristics with user inputted values and adjusts operating conditions in the housing.

16. The multi-zone textile dryer of claim 15 wherein the physical characteristics include humidity in the housing and pressure in the housing.

17. The multi-zone textile dryer of claim 8 wherein each of the first conveyor system and the second conveyor system have a same length.

18. The multi-zone textile dryer of claim 17 wherein each of the first conveyor system and the second conveyor system are mounted for reciprocal translational motion.

19. The multi-zone textile dryer of claim 15 wherein the controller can maintain a first set of conditions in the first zone and a second set of conditions in the second zone that are different than the first set of conditions.

20. The multi-zone textile of claim 15 wherein the first zone is larger than the second zone.

* * * * *